United States Patent
Olander

(10) Patent No.: US 6,471,750 B1
(45) Date of Patent: Oct. 29, 2002

(54) GAS CABINET ASSEMBLY COMPRISING BACK MIGRATION SCRUBBER UNIT

(75) Inventor: W. Karl Olander, Indian Shores, FL (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/924,866

(22) Filed: Aug. 8, 2001

(51) Int. Cl.[7] .................................................. B01D 53/46
(52) U.S. Cl. .............................. 95/116; 95/12; 96/111; 55/385.4; 222/3
(58) Field of Search .............................. 95/12, 90, 116, 95/131; 96/108, 111, 148; 55/385.4, DIG. 30; 454/184; 222/3; 423/240 R, 248

(56) References Cited

U.S. PATENT DOCUMENTS

| | | | |
|---|---|---|---|
| 4,625,627 A | * 12/1986 | Livanos et al. | 454/237 |
| 4,889,542 A | * 12/1989 | Hayes | 174/16.1 |
| 5,126,117 A | * 6/1992 | Schumacher et al. | 422/169 |
| 5,151,395 A | 9/1992 | Tom et al. | |
| 5,518,528 A | 5/1996 | Tom et al. | |
| 5,725,622 A | * 3/1998 | Whitson et al. | 361/695 |
| 5,756,060 A | * 5/1998 | Otsuka et al. | 423/240 R |
| 5,891,223 A | * 4/1999 | Shaw et al. | 55/385.4 |
| 5,964,659 A | 10/1999 | Hertzler et al. | |
| 6,189,369 B1 | * 2/2001 | Yokogi | 340/605 |

FOREIGN PATENT DOCUMENTS

JP    410249144 A  *  9/1998

\* cited by examiner

*Primary Examiner*—David A. Simmons
*Assistant Examiner*—Frank M. Lawrence
(74) *Attorney, Agent, or Firm*—Oliver A. Zitzmann; Margaret Chappuis

(57) ABSTRACT

A gas containment assembly including a containment enclosure defining an enclosed interior volume, with an exhaust inlet and an exhaust outlet for flow of exhaust gas into the enclosed interior volume through the exhaust inlet and flow from the containment enclosure through the exhaust outlet. A gas supply vessel and/or gas flow circuitry is provided in the interior volume of the containment enclosure. A back-migration scrubber unit overlies and is sealed to the exhaust inlet so that back-flow migration of gas from the gas supply vessel and/or gas flow circuitry in the interior volume of the containment enclosure is sorptively taken up by sorbent material in the scrubber unit and prevented from passing into an ambient environment in which said gas containment assembly is deployed. This arrangement permits significant reduction in the flow rate of exhaust gas through the gas containment enclosure without compromising the safety of the gas containment assembly.

28 Claims, 4 Drawing Sheets

GAS CABINET ASSEMBLY COMPRISING BACK MIGRATION SCRUBBER UNIT

BACKGROUND OF THE INVENTION

1. Field of the Invention

This invention relates to gas supply apparatus such as a gas cabinet for delivery of hazardous gases in the manufacture of semiconductor materials and devices, equipped with a scrubber unit to prevent back-migration of the hazardous gases into the ambient environment in which the apparatus is disposed.

2. Description of the Related Art

In the manufacture of semiconductor materials and devices, the semiconductor manufacturing facility ("fab") typically desires to reduce the level of exhaust (by lowering its volumetric flow rate) that is used to ventilate process equipment and process gas storage and dispensing enclosures. Such gas cabinet enclosures hold one or more gas supply vessels, e.g., of conventional high pressure gas cylinder type, or of the kind disclosed in U.S. Pat. No. 5,518,528 to Glenn M. Tom, et al. including sorbent in the gas supply vessel sorptively retaining the gas for subsequent dispensing operation.

Applicable regulations and tracer gas protocols require that gas cabinets be vented at a rate such that "worse case" releases cannot create unsafe conditions outside of the gas cabinet enclosure. For example, SEMI S15 tracer gas protocols establish a procedure for testing gas cabinets to ensure that during worst case releases, concentrations of hazardous gas outside the gas cabinet do not exceed ¼ of the TLV for the gas.

Exhaust air requirements thus are imposed to ensure that the ambient environment of the gas cabinet is not contaminated with hazardous gas at concentrations that compromise the health or safety of personnel in the fab. In consequence, the exhaust air system is overdesigned and requires significant capital investment in pumps, blowers, fans, ducting, etc.

It would therefore be a significant advance in the art to provide a system that permits the exhaust air requirement for the gas cabinet to be reduced, without any countervailing adverse effect on the safety or operability of the gas cabinet.

Other gas storage and gas supply systems have corresponding exhaust gas issues. These include gas storage bunkers, valve manifold boxes (VMBs), and other gas storage, use and distribution systems in which an enclosure holds gas supply vessels and/or gas flow circuitry.

SUMMARY OF THE INVENTION

The present invention relates to an enclosure assembly including a gas enclosure defining an enclosed interior volume holding gas supply vessel(s) and/or gas flow circuitry therein and equipped with a back-migration scrubber unit.

In one aspect, the invention relates to a gas containment assembly, comprising:

a containment enclosure defining an enclosed interior volume, and including an exhaust inlet and an exhaust outlet for flow of exhaust gas into the enclosed interior volume through the exhaust inlet and flow through the interior volume for discharge from the containment enclosure through the exhaust outlet;

a gas supply vessel and/or gas flow circuitry in the interior volume of the containment enclosure;

a back-migration scrubber unit overlying and sealed to the exhaust inlet to permit flow of exhaust gas therethrough into the exhaust inlet, said back-migration scrubber unit comprising a mass of sorbent material having sorptive affinity for gas in said gas supply vessel and/or gas flow circuitry in the interior volume of the containment enclosure, whereby back-flow migration of gas from said gas supply vessel and/or gas flow circuitry in the interior volume of the containment enclosure is sorptively taken up by the mass of sorbent material and prevented from passing into an ambient environment in which said gas containment assembly is deployed.

In another aspect, the invention relates to a method of supplying gas to a gas-consuming process, comprising the steps of:

providing a gas containment assembly comprising a containment enclosure defining an enclosed interior volume, and including an exhaust inlet and an exhaust outlet for flow of exhaust gas into the enclosed interior volume through the exhaust inlet and flow through the interior volume for discharge from the containment enclosure through the exhaust outlet, with a gas supply vessel and/or gas flow circuitry in the interior volume of the containment enclosure;

flowing exhaust gas along an exhaust gas flow path including the exhaust inlet, interior volume of the containment enclosure and exhaust outlet;

disposing in the exhaust gas flow path upstream of the exhaust inlet and in closed flow communication therewith a mass of sorbent material having sorptive affinity for gas in said gas supply vessel and/or gas flow circuitry in the interior volume of the containment enclosure; and contacting with said mass of sorbent material any back-flow migration of gas from said gas supply vessel and/or gas flow circuitry in the interior volume of the containment enclosure, whereby back-flow migrating gas is sorptively taken up by the mass of sorbent material and prevented from passing into an ambient environment in which said gas containment assembly is deployed.

Other aspects, features and embodiments in the invention will be more fully apparent from the ensuing disclosure and appended claims.

DETAILED DESCRIPTION OF THE INVENTION, AND PREFERRED EMBODIMENTS THEREOF

Figure 1:
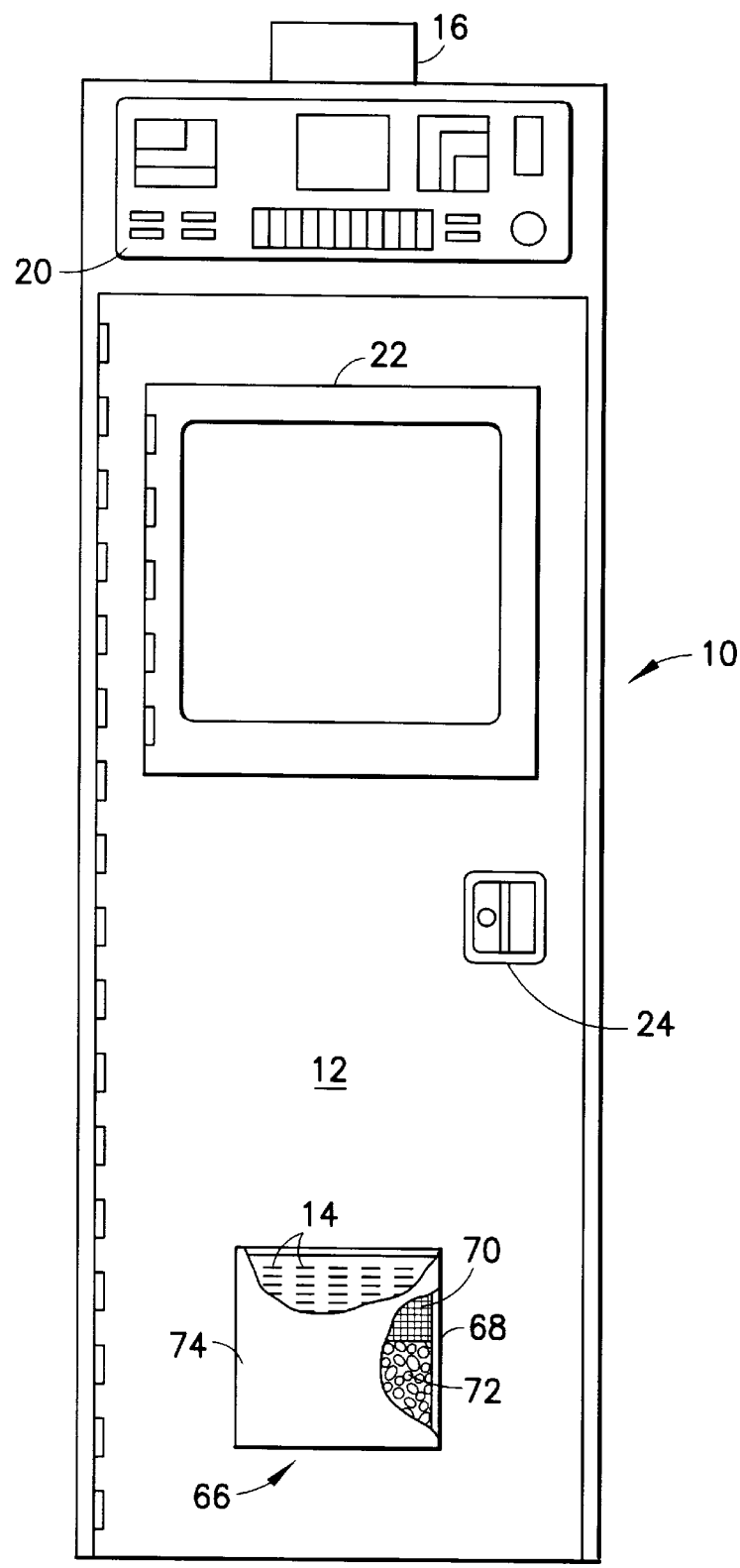
FIG. 1 is a schematic front elevation view of a gas cabinet equipped with the back-migration scrubber unit of the invention, according to one embodiment thereof.

The disclosures of the following United States Patents are hereby incorporated herein by reference in their entireties: U.S. Pat. No. 5,518,528 issued May 21, 1996 to Glenn M. Tom et al.; U.S. Pat. No. 5,151,395 issued Sep. 29, 1992 to Glenn M. Tom; and U.S. Pat. No. 5,964,659 issued Oct. 12, 1999 to Benjamin Lee Hertzler, et al.

The present invention is based on the discovery that the exhaust gas requirements for gas cabinets and similar enclosures containing gas supply vessel(s) and/or gas flow circuitry may be substantially reduced by disposing sorbent filter over the air inlet of the gas cabinet.

The filter, containing sorbent that is sorptively selective for the hazardous gas component(s) contained (in the gas supply vessel(s) and/or gas flow circuitry) in the enclosure, is thereby disposed in the exhaust gas inlet flow path, reduces any back-migration of the toxic gas from the interior volume of the enclosure into the ambient environment.

The sorbent that is used in the filter may be of any appropriate type, including chemical sorbents (chemisorbents) as well as physical sorbents as useful sorbent materials. Preferably, the sorbent is a chemisorbent, and takes up the toxic gas species in the interior volume gas by oxidation or neutralization chemical reaction.

The filter may be simply fabricated to include containment layers that enclose the sorbent material. In general, with respect to chemisorbents as sorbent materials in the back-migration filter, chemisorbents of the type used in emergency gas release scrubbers are suitably employed. Examples of sorbents of such type include Pionics R-30 scrubber resin, commercially available from Japan Pionics Corporation, and activated carbon sorbents (e.g., whetterlized carbon sorbents) commercially available from Calgon Carbon, as well as the sorbents described in the aforementioned U.S. Pat. No. 5,151,395 issued Sep. 29, 1992 to Glenn M. Tom.

The aforementioned containment layers of the filter also function as particle filtration elements, to keep extraneous particulate matter out of the sorbent, as well as restricting loss of the sorbent from the filter (e.g., by attrition of fines).

The filter of the back-migration scrubber unit can be advantageously mounted in a frame and affixed in any suitable manner to the gas containment enclosure.

In one embodiment, the filter is mounted in a frame that is affixed over the exhaust inlet louvers of a gas cabinet using gasket elements or other leak-tight securement members to provide a leak-tight seal of the filter to the enclosure. In this manner, the filter overlies the exhaust gas inlet structure of the cabinet and ensures that no toxic gas components will egress from the cabinet and pass into the open ambient environment of the fab.

The filter is usefully formed as a generally planar element, having a thickness that may for example be on the order of ¼ inch to about 1 inch in thickness. Such dimensional character is suited to the use of particulate sorbent material that has appropriate sorptive affinity for the toxic or otherwise harzardous gas component(s) of interest. Filters of such type advantageously have a useful operating life on the order of nominally one year.

The filter in one embodiment has a front face dimension of 12 inches in height and 18 inches in width, with a thickness on the order of ½ to 1 inch, accommodating a flow of exhaust gas at linear velocities on the order of 25–100 ft/minute and contact times of the gas stream with the filter in the range of 0.02 to about 0.25 second.

Although the invention is primarily described herein in application to gas cabinets of the type commonly used in the semiconductor manufacturing industry, it will be appreciated that the utility of the invention is not thus limited, but rather extends to and includes other gas containment enclosures containing gas supply vessel(s) and/or gas flow circuitry. Examples of such other gas enclosure systems include gas storage bunkers, valve manifold boxes (VMBs), and related gas storage, distribution and use facilities.

For gas cabinet and VMB applications, the back migration scrubber filter of the invention can be advantageously used in combination with an automated damper assembly located in a duct above the enclosure or otherwise disposed in a flow discharge passage that is positioned to facilitate egress of exhaust gases from the enclosure.

For example, in a gas cabinet including such damper assembly, the damper assembly modulates the exhaust from the enclosure based on the activity in the cabinet, e.g., gas cylinder change-out and/or maintenance. During normal operations, the exhaust is dampered back to ca. ⅕ of its normal flow rate.

A gas detector is suitably arranged to monitor the exhaust to determine the presence therein of the toxic gas component (s) of interest, evidencing the occurrence of a leak in the gas supply vessels and/or connecting piping, etc., in the cabinet. When the toxic gas component is detected by the sensor element of the monitoring unit, an alarm is actuated, and the damper is actuated to open to the maximum extent, thereby exhausting the gas from the interior volume of the gas cabinet enclosure. In addition to such actuation steps, the gas cabinet can be deactivated, to isolate the supply vessel, leaking fitting, etc.

In such a gas cabinet system, the presence of the back-migration scrubber filter mitigates adverse effect from a failure or slow response from the monitoring sensor element and/or damper motor. The filter is appropriately sized and rated (with respect to the sorptive capacity of the sorbent filter for the toxic or otherwise hazardous gas component(s) of interest) to contain a 100% release of the gas in the cabinet enclosure under the worst case condition at the reduced ventilation condition enabled by the back-migration scrubber filter.

In other words, the back-migration scrubber filter unit of the invention permits less exhaust flow to be employed since the scrubber filter unit provides an enhanced measure of safety relative to the out-flow of hazardous gas from the enclosure's interior volume. Accordingly, less "sweep gas" is needed to ensure that no escape of hazardous gas occurs from the enclosure.

As an associated benefit of the use of the scrubber filter unit of the invention, the enclosure is able to efficiently operate under reduced ventilation conditions, and the gas leak detectors used in the enclosure or associated flow passages are able to work more efficiently with substantially reduced response times, since the hazardous gas in the event of a leak will be in a more concentrated state.

Referring now to the drawings, FIG. 1 is a schematic front elevation view of a gas cabinet 10 equipped with the back-migration scrubber unit 66 of the invention, according to one embodiment thereof.

The gas cabinet 10 is of vertically upwardly extending character, and may be formed of metal or other suitable material, forming an enclosure of box-like form, having a door 12 including a louvered inlet 14 as shown. The louvered inlet allows ambient air to enter the cabinet and flow therethrough to the exhaust duct 16.

Figure 4:
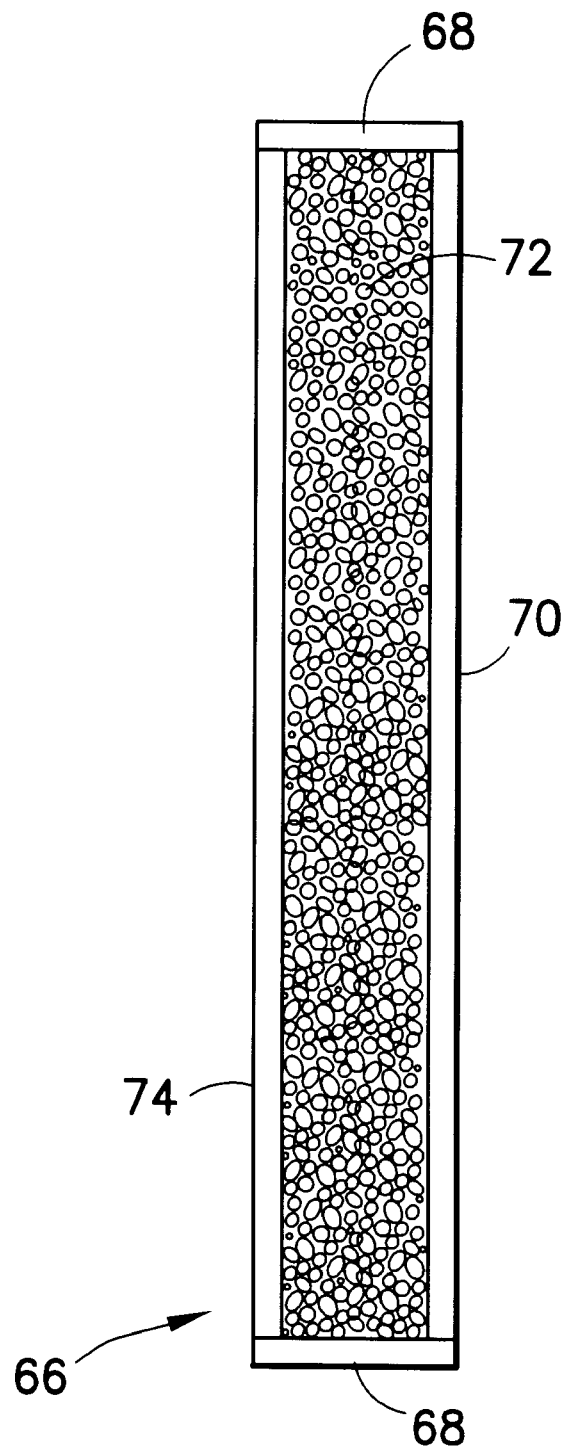
FIG. 4 is a cross-sectional elevation view of a back-migration scrubber unit of the FIG. 1 gas cabinet assembly.

Overlying the louvered inlet 14 is a scrubber unit 66 according to one embodiment of the invention. The scrubber unit 66 includes a front porous, gas-permeable containment layer 74, and a corresponding back porous, gas-permeable containment layer 70. These front and back layers contain a bed or mass of sorbent material 72 therebetween. The front and back containment layers 70 and 74 are joined to the frame 68 which circumscribes the scrubber unit so that the unit is of generally flat and planar form, as hereinafter more fully appreciated in respect of the FIG. 4 illustration of the scrubber unit.

The scrubber unit 66 thereby allows the flow therethrough of exhaust air, which then passes though the louvered inlet 14 and into the interior volume of the gas cabinet, being ultimately exhausted through the exhaust duct 16.

On the upper front face of the cabinet 10 is a control panel 20. The door of the cabinet has an observation window 22 therein, and is equipped with a latch 24 for secure closure of the door to the body of the gas cabinet.

Figure 2:
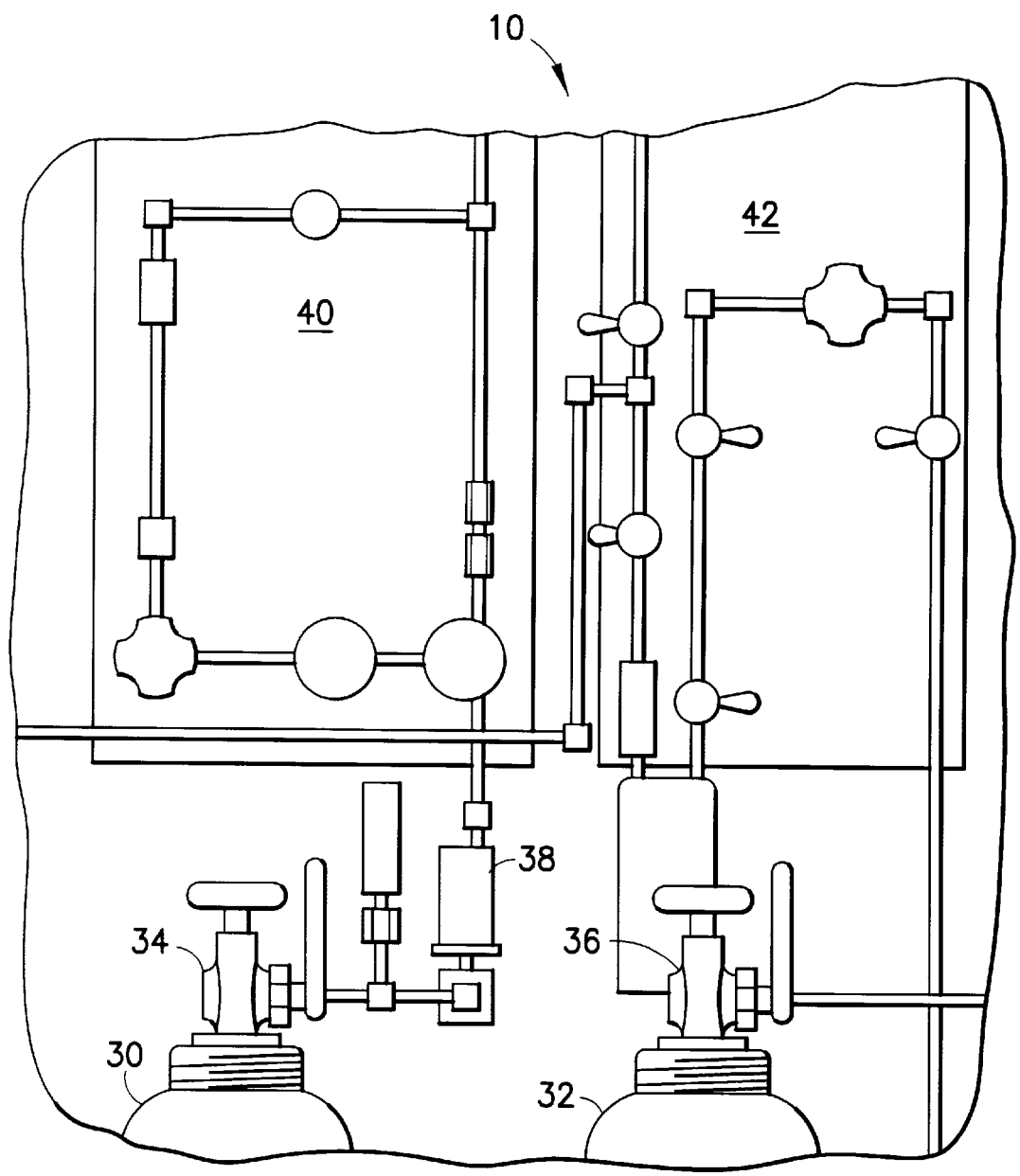
FIG. 2 is a view of a portion of the interior of the gas cabinet of FIG. 1.

FIG. 2 is a view of a portion of the interior of the gas cabinet of FIG. 1. The interior volume of the cabinet 10 contains gas supply vessels 30, each of which can comprise a conventional high pressure gas cylinder holding the gas components of interest, e.g., arsine, silane, boron trifluoride, etc., or alternatively a supply vessel holding therein a physical sorbent material having sorptive affinity for the gas to be stored in and dispensed from the vessel, and having the gas physically adsorbed on the sorbent medium as described more fully in the aforementioned U.S. Pat. No. 5,518,528.

The vessels shown in FIG. 2 may for example contain in a first of the vessels a reagent gas for semiconductor manufacturing, such as a dopant, etchant, or epitaxial thin film precursor gas, and in a second of such vessels a purge or carrier gas. The vessels as shown each have a flow control valve (34 on vessel 30 and 36 on vessel 32) for controlling the flow of gas from the vessel, in conjunction with a flow controller 38 in the associated gas manifolding. The manifolding is associated with respective gas panels 40 and 42, and comprises appropriate sensing, monitoring, valving, controlling, piping and coupling elements. The coupling elements may be contained in a valve manifold box, to sequester same in the interior volume of the gas cabinet.

Figure 3:
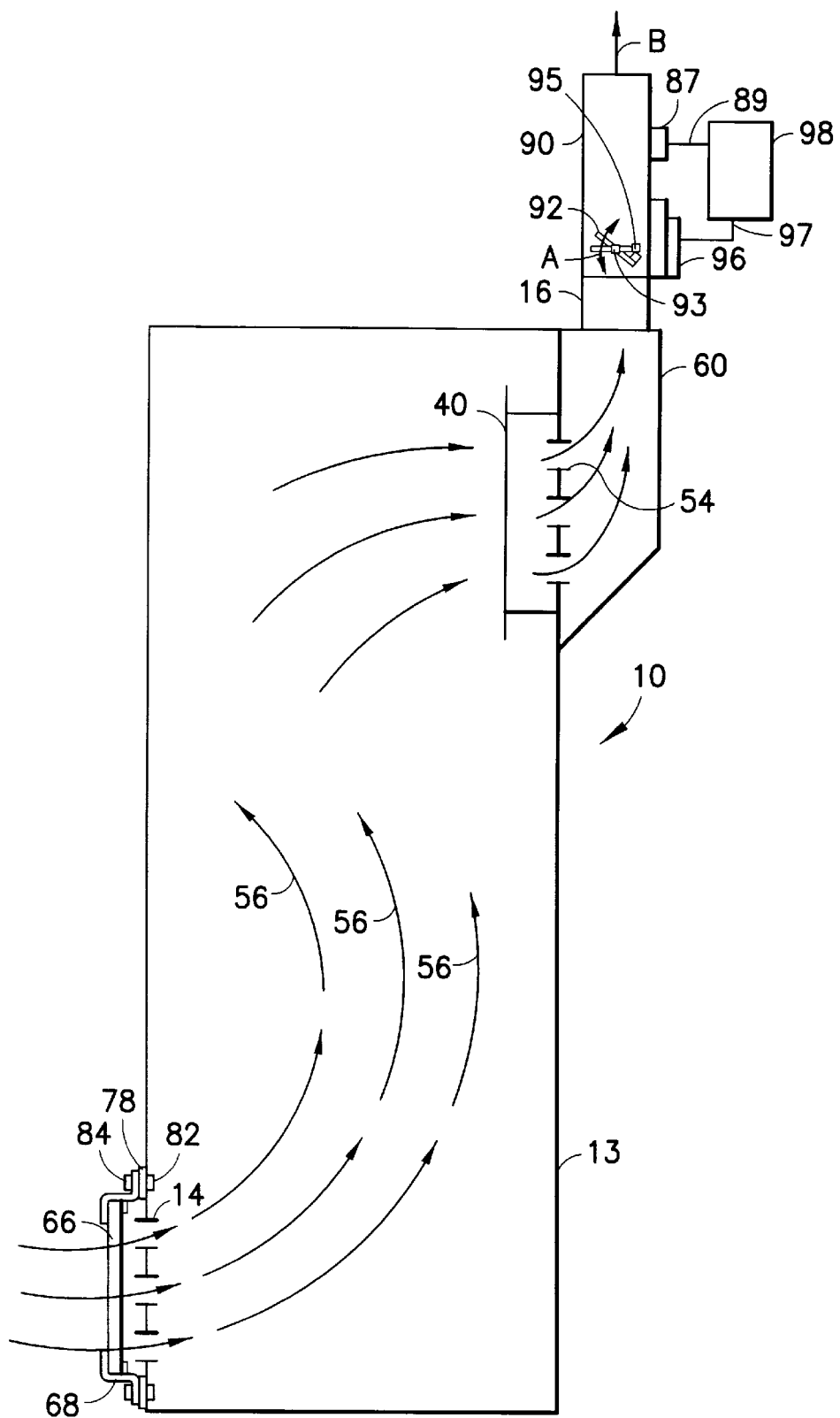
FIG. 3 is a schematic side elevation view of the gas cabinet of FIG. 1, showing the details of operation thereof.

FIG. 3 is a schematic side elevation view of the gas cabinet 10 of FIG. 1, showing the details of construction and operation thereof.

The gas cabinet features exhaust port 60 is placed on the back wall of the cabinet 13 communicating with the exhaust duct 16. The back wall has louvered discharge openings 54 therein. The gas panel 40 is mounted on the back wall in spaced relationship to the wall surface to allow the flow of the exhaust gas through the louvered discharge openings to the exhaust duct 16.

The front wall of the gas cabinet 10 has louvered inlet openings 14 in the door (not specifically delineated in the FIG. 3 drawing). Overlying the louvered inlet openings 14 is a scrubber filter unit in accordance with the invention, and as described hereinabove in connection with FIG. 1 hereof. The scrubber filter unit 66 includes a frame 68 that as shown in the FIG. 3 embodiment has a peripheral flange. The flange is arranged to bear compressively against the sealing gasket 78. A bolt 82 and nut 84 assembly is provided, with the bolt passing through receiving openings in the gasket, flange and front door panel of the enclosure, to leak-tightly retain the scrubber filter 66 in position over the louvered inlet openings 14.

By this arrangement, ambient air flows through the scrubber filter 66 and the louvered inlet openings 14 in the front door panel, and circulates through the interior volume of the cabinet in the direction indicated by arrows 56, flowing over the panel 40, or through panel 40 in the event that panel 40 is itself louvered or provided with flow apertures therein, through the discharge openings 54 into the exhaust port 60.

The exhaust port 60 is joined to exhaust duct 16. The duct 16 is in turn joined to exhaust conduit 90, containing damper element 92 mounted on pivot axle 93 for movement in either of the directions indicated by bi-directional arrow A.

The damper element 92 has a magnetic control boss 95 on the right-hand extremity of the element in the view shown.

The magnetic control boss 95 is magnetically coupled to magnetic controller 96, which is actuatable by central processor unit 98 joined in signal transmission relationship to the magnetic controller by signal transmission line 97.

The central processor unit 98 in turn is linked in signal-receiving relationship via signal transmission line 89 to the toxic gas monitor 87.

In operation, as exhaust gas flows through the cabinet and exhaust port 60, exhaust duct 16 and exhaust conduit 90, discharging from the system in the direction indicated by arrow B, the exhaust gas stream is monitored for the presence of toxic gas by the monitor 87. Upon detection of toxic gas, the monitor 87 sends a control signal in line 89 to the central processor unit 98, which in turn sends an output signal in line 96 to the magnetic controller 96, which acts to translate the damper element 92 via the magnetic control boss 95 and open the damper element to a fully open position. This allows maximum flow of the exhaust gas to flow through the gas cabinet and associated exhaust gas passages.

The gas cabinet control circuitry may be interfaced with the damper control system as well, e.g., by having a panel door open condition trigger full exhaust. The control system may also be linked with toxic gas monitoring systems in the interior volume of the gas cabinet which on sensing of a hazardous gas "lock down" the panel door of the cabinet so that it cannot be opened, while actuating the full exhaust mode of operation.

The gas cabinet assembly of the invention is usefully constructed and operated so that even in the event of a full-scale release of toxic gas in the interior volume of the gas cabinet, the concentration of toxic gas outside the cabinet does not exceed ¼ of the TLV concentration. This is ensured by the scrubber filter of the present invention on the gas cabinet exhaust gas inlet. By contrast, a conventionally constructed and operated gas cabinet would require an enormously high flux of exhaust gas through the gas cabinet in the event of a full-scale release event (e.g., such as occurs when a high pressure cylinder ruptures, or a valve head breaks) to maintain the same exterior environment TLV conditions.

FIG. 4 is a cross-sectional elevation view of a back-migration scrubber unit 66 of the FIG. 1 gas cabinet assembly.

As illustrated, the back migration scrubber unit 66 has a front containment layer 74 which may be of any suitable porous material permeable to air flow therethrough, but sufficient to retain the sorbent medium 72 in place in the unit. A corresponding back containment layer 70 is provided on an opposite face of mass of the sorbent medium.

The scrubber unit 66 is circumscribed on its edges by frame members 68 as illustrated.

The front and back containment layers may be of felt or screen construction, or may comprise a mesh or sintered porous structure. The sorbent medium 72 is preferably of finely divided form, e.g., in the form of beads, pellets, extruded cylindrical shapes, etc. The appropriate materials for the front and back porous layers and the sorbent medium particle size may be determined by simple flow conductance tests to determine the appropriate porosity and void volume characteristics of these constituent layers of the scrubber unit.

While the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

What is claimed is:

1. A gas containment assembly, comprising:
    a containment enclosure defining an enclosed interior volume, and including an exhaust inlet and an exhaust outlet for flow of exhaust gas into the enclosed interior volume through the exhaust inlet and flow through the interior volume for discharge from the containment enclosure through the exhaust outlet;
    a gas supply vessel and/or gas flow circuitry in the interior volume of the containment enclosure;
    a back-migration scrubber unit overlying and sealed to the exhaust inlet to permit flow of exhaust gas therethrough into the exhaust inlet, said back-migration scrubber unit comprising a mass of sorbent material having sorptive affinity for gas in said gas supply vessel and/or gas flow circuitry in the interior volume of the containment enclosure, whereby back-flow migration of gas from said gas supply vessel and/or gas flow circuitry in the interior volume of the containment enclosure is sorptively taken up by the mass of sorbent material and prevented from passing into an ambient environment in which said gas containment assembly is deployed.

2. The gas containment assembly of claim 1, wherein the sorbent material comprises a chemisorbent material.

3. The gas containment assembly of claim 2, wherein the sorbent material chemically reacts with said gas from said gas supply vessel and/or gas flow circuitry in the interior volume of the containment enclosure, by oxidation or neutralizing reaction.

4. The gas containment assembly of claim 1, wherein the containment enclosure comprises a gas cabinet for supplying gas to a semiconductor manufacturing process.

5. The gas containment assembly of claim 4, wherein the gas cabinet includes a main body portion and a door panel hingedly attached to the main body portion, wherein the exhaust inlet is on the door panel.

6. The gas containment assembly of claim 4, wherein the gas cabinet has at least one gas supply vessel disposed therein.

7. The gas containment assembly of claim 6, wherein the gas supply vessel comprises a high pressure gas cylinder.

8. The gas containment assembly of claim 6, wherein the gas supply vessel comprises a vessel holding a physical adsorbent medium having a gas sorptively retained on the physical adsorbent medium.

9. The gas containment assembly of claim 1, wherein the gas in said gas supply vessel and/or gas flow circuitry in the interior volume of the containment enclosure, comprises a semiconductor manufacturing gas.

10. The gas containment assembly of claim 9, wherein the semiconductor manufacturing gas comprises one or more of etchant gases, dopant gases and epitaxial film precursor gases.

11. The gas containment assembly of claim 1, wherein the back-migration scrubber unit has a generally flat and rectangular conformation, and comprises a mass of chemisorbent material between layers of porous, gas-permeable material allowing exhaust gas flow therethrough into the interior volume of the containment enclosure for discharge from the containment enclosure through the exhaust outlet.

12. The gas containment assembly of claim 1, wherein the exhaust outlet comprises an exhaust gas flow passage having mounted therein a damper arranged to modulate the flow of exhaust gas therethrough, and the gas containment assembly comprises: (a) a process monitoring unit arranged to detect in exhaust gas flowed therethrough the presence of gas from said gas supply vessel and/or gas flow circuitry, and (b) a controller unit coupled to the process monitoring unit and to the damper, and responsively arranged to adjust the damper when the process monitoring unit detects in said exhaust gas the presence of gas from said gas supply vessel and/or gas flow circuitry.

13. The gas containment assembly of claim 1, wherein the containment enclosure comprises a gas storage bunker.

14. The gas containment assembly of claim 1, wherein the containment enclosure comprises a valve manifold box.

15. A method of supplying gas to a gas-consuming process, comprising the steps of:
    providing a gas containment assembly comprising a containment enclosure defining an enclosed interior volume, and including an exhaust inlet and an exhaust outlet for flow of exhaust gas into the enclosed interior volume through the exhaust inlet and flow through the interior volume for discharge from the containment enclosure through the exhaust outlet, with a gas supply vessel and/or gas flow circuitry in the interior volume of the containment enclosure;
    flowing exhaust gas along an exhaust gas flow path including the exhaust inlet, interior volume of the containment enclosure and exhaust outlet;
    disposing in the exhaust gas flow path upstream of the exhaust inlet and in closed flow communication therewith a mass of sorbent material having sorptive affinity for gas in said gas supply vessel and/or gas flow circuitry in the interior volume of the containment enclosure; and
    contacting with said mass of sorbent material any back-flow migration of gas from said gas supply vessel and/or gas flow circuitry in the interior volume of the containment enclosure, whereby back-flow migrating gas is sorptively taken up by the mass of sorbent material and prevented from passing into an ambient environment in which said gas containment assembly is deployed.

16. The method of claim 15, wherein the gas-consuming process comprises a semiconductor manufacturing process.

17. The method of claim 15, wherein the sorbent material comprises a chemisorbent material.

18. The method of claim 17, wherein the sorbent material chemically reacts with said gas from said gas supply vessel and/or gas flow circuitry in the interior volume of the containment enclosure, by oxidation or neutralizing reaction.

19. The method of claim 15, wherein the containment enclosure comprises a gas cabinet for supplying gas to a semiconductor manufacturing process.

20. The method of claim 19, wherein the gas cabinet includes a main body portion and a door panel hingedly attached to the main body portion, wherein the exhaust inlet is on the door panel.

21. The method of claim 19, wherein the gas cabinet has at least one gas supply vessel disposed therein.

22. The method of claim 21, wherein the gas supply vessel comprises a high pressure gas cylinder.

23. The method of claim 21, wherein the gas supply vessel comprises a vessel holding a physical adsorbent medium having a gas sorptively retained on the physical adsorbent medium.

24. The method of claim 15, wherein the gas in said gas supply vessel and/or gas flow circuitry in the interior volume of the containment enclosure, comprises a semiconductor manufacturing gas.

25. The method of claim 24, wherein the semiconductor manufacturing gas comprises one or more of etchant gases, dopant gases and epitaxial film precursor gases.

26. The method of claim 15, wherein the exhaust outlet comprises an exhaust gas flow passage having mounted therein a damper arranged to modulate the flow of exhaust gas therethrough, and a process monitoring unit is arranged to detect the presence of gas from said gas supply vessel and/or gas flow circuitry in exhaust gas flowed along the exhaust gas flow path, with a controller unit coupled to the process monitoring unit and to the damper, and responsively arranged to adjust the damper when the process monitoring unit detects in said exhaust gas the presence of gas from said gas supply vessel and/or gas flow circuitry.

27. The method of claim 15, wherein the containment enclosure comprises a gas storage bunker.

28. The method of claim 15, wherein the containment enclosure comprises a valve manifold box.

* * * * *